(12) United States Patent
Stork genannt Wersborg

(10) Patent No.: US 8,456,523 B2
(45) Date of Patent: Jun. 4, 2013

(54) LASER PROCESSING HEAD AND METHOD FOR COMPENSATING FOR THE CHANGE IN FOCUS POSITION IN A LASER PROCESSING HEAD

(75) Inventor: Ingo Stork genannt Wersborg, München (DE)

(73) Assignees: Precitec KG, Gaggenau-Bad Rotenfels (DE); Precitec ITM GmbH, Eschborn (DE)

( * ) Notice: Subject to any disclaimer, the term of this patent is extended or adjusted under 35 U.S.C. 154(b) by 0 days.

(21) Appl. No.: 13/386,352

(22) PCT Filed: Jul. 20, 2010

(86) PCT No.: PCT/EP2010/004437
§ 371 (c)(1),
(2), (4) Date: Apr. 3, 2012

(87) PCT Pub. No.: WO2011/009594
PCT Pub. Date: Jan. 27, 2011

(65) Prior Publication Data
US 2012/0188365 A1    Jul. 26, 2012

(30) Foreign Application Priority Data

Jul. 20, 2009 (DE) .......................... 10 2009 033 881
Sep. 8, 2009 (EP) ..................................... 09011481

(51) Int. Cl.
*H04N 5/253* (2006.01)
(52) U.S. Cl.
USPC ........................................................... 348/90
(58) Field of Classification Search
USPC ........................................................... 348/90
See application file for complete search history.

(56) References Cited

U.S. PATENT DOCUMENTS

| 5,098,426 A * | 3/1992 | Sklar et al. ........................ 606/5 |
| 5,936,717 A * | 8/1999 | Viola ............................... 356/72 |
| 2008/0030565 A1* | 2/2008 | Shimomura et al. ............ 347/118 |

FOREIGN PATENT DOCUMENTS

| DE | 197 16 293 A1 | 10/1998 |
| DE | 10 2004 043076 A1 | 4/2005 |

* cited by examiner

Primary Examiner — Jay Patel
Assistant Examiner — Richard Torrente
(74) Attorney, Agent, or Firm — Muncy, Geissler, Olds & Lowe, PLLC

(57) ABSTRACT

The invention relates to a laser machining head (100) for machining a workpiece by means of a working laser beam (108), with a camera (102) with an imaging lens system (116) arranged in front of said camera in the beam path for observing a machining region of the workpiece that is being machined by means of the working laser beam (108), with a focusing lens system (114) for focusing the working laser beam (108) on the workpiece surface (104) or on a position defined in relation to the workpiece surface (104), and with an evaluation unit (122) which is designed to calculate a corrective adjusting displacement ($\Delta Z_{os}$, $\Delta Z_B$) by means of an adjusting displacement ($\Delta dKL$) of the imaging lens system (116) in the direction of the optical axis in order to refocus the camera image when there is a shift in the focal point of the focusing lens system (114), which corrective adjustment displacement compensates a shift in the focal point of the focusing lens system (114) in relation to the workpiece surface (104) or with respect to a position defined in relation to the workpiece surface (104).

15 Claims, 12 Drawing Sheets

LASER PROCESSING HEAD AND METHOD FOR COMPENSATING FOR THE CHANGE IN FOCUS POSITION IN A LASER PROCESSING HEAD

The invention relates to a laser processing head and to a method for compensating for the change in focus position in said laser processing head, in particular for monitoring and closed-loop control of the focal point position and size during laser material processing and for visualizing processing surface, melt pool, process emission and vapour capillary (key hole) in images computationally taken into account with one another and also for the technical-cognitive operation of laser processing processes.

During the processing of materials by means of a laser processing head, laser radiation is focused by means of a lens system. However, the lens system itself is heated by means of laser light during the material processing, as a result of which the optical properties of the lens system used also change. This also results in a change in the focus position of the beam profile of the laser light. A change in said focus position relative to the position of the materials to be processed can have the effect that the desired processing result is not achieved.

Diverse monitoring systems are used for the process monitoring in laser material processing processes. Said monitoring systems are based in part on the detection of process emissions, that is to say, in particular, of electromagnetic radiation from the interaction zone between laser beam and workpiece, by means of photodiodes, other photosensors or imaging sensor technology, in particular a camera. For the purpose of real-time or in-process monitoring, a camera is generally integrated into the optical system of a laser processing head, e.g. by means of a coated semitransparent surface.

Approaches for determining the change in focus position relative to the workpiece by means of intensities of individual photodiodes have already been discussed in the art.

Thus, a method is known which introduces two optical sensors for different wavelengths into the optical fibre of the laser light supplied. In this case, an attempt is made to draw a conclusion about the change in focus position on the basis of the relative change in the intensities of the two optical sensors with respect to one another, in order to then compensate for the change in focus position, cf. F. Haran, D. Hand, C. Peters and J. Jones "Real-time focus control in laser welding", Meas. Sci. Technol., Year: 1996, pages: 1095-1098.

In a further known method, by means of a photodiode, the intensity of a wavelength is measured during a laser welding process with focus position variation relative to the workpiece. Using neural networks, a function has been approximated which corresponds to the output of the photodiode and which has subsequently been used for the compensating control of the focus position, cf. G. Hui, O. Flemming Ove, "Automatic Optimization of Focal Point Position in CO2 Laser Welding with Neural Networks in Focus Control System", year 1997.

DE 195 163 76 discloses the fact that, by impressing a focal spot oscillation, the optimal focus position is calculated from the converted amplitude and phase relationship of a photodiode intensity.

DE 199 254 13 describes a device for determining the focal point position of a welding beam.

It is an object of the present invention to provide a laser processing head and a method for compensating for the change in focus position in a laser processing head by means of which it is possible to maintain a defined relative focus position with respect to processed materials during a processing process in an effective manner.

This object is achieved by the laser processing head according to claim 1 and by the method according to the invention in accordance with the alternative independent claim 15. Advantageous configurations and developments of the invention are set out in the dependent claims.

In particular, the object is achieved by virtue of the fact that the change in focus position relative to the workpiece is detected and the focus position is then adapted after corresponding calculation of a correction factor.

Moreover, when an imaging sensor unit is used, images of the processing process which have the highest possible quality should also arise.

The heart of the invention is detection of the change in focus position relative to the processing surface and a corresponding correction of the focus position or of the focal spot diameter in laser material processing processes. The detection is effected either by means of the image sharpness of the imaging monitoring sensor system or of a temperature sensor in the laser processing head or of the used radiation intensity resulting from light energy per time interval or an approximated model, calculated from the measured caustic curve of the laser processing head at different laser radiation intensities, or a self-learning mechanism or a technical-cognitive method taking account of learnt empirical values, or one of a plurality of elements of these detection possibilities and the adaptation of the focus position by changing the position of the laser processing head relative to the processing surface or by adapting movable parts of the optical system used.

The invention therefore proposes a laser processing head and a method for adapting the focus position. The laser processing head according to the invention comprises a camera with an imaging optical unit arranged upstream thereof in the beam path and serving for observing a processing region of a workpiece which is processed by means of a working laser beam, in particular by welding or cutting, a focusing optical unit for focusing the working laser beam onto the workpiece, and an evaluation unit adapted to calculate an adjustment travel which compensates for, balances or evens out a focal point displacement or shift of the focusing lens by means of an adjustment travel of the imaging optical unit in the direction of the optical axis, which is necessary for focusing the camera image again in the event of a displacement of the focal point of the focusing lens. According to the invention, it is furthermore possible to use cognitive systems which, by means of a learning process, control the adjustment of the focusing lens depending on a processing time or on processing situations such that the working focus of the laser beam always lies on the workpiece surface or in a position defined relative to the workpiece surface, in order thus to yield an optimum welding or separating or laser processing result.

The invention is explained in greater detail below by way of example with reference to the drawing, in which.

Figure 11:
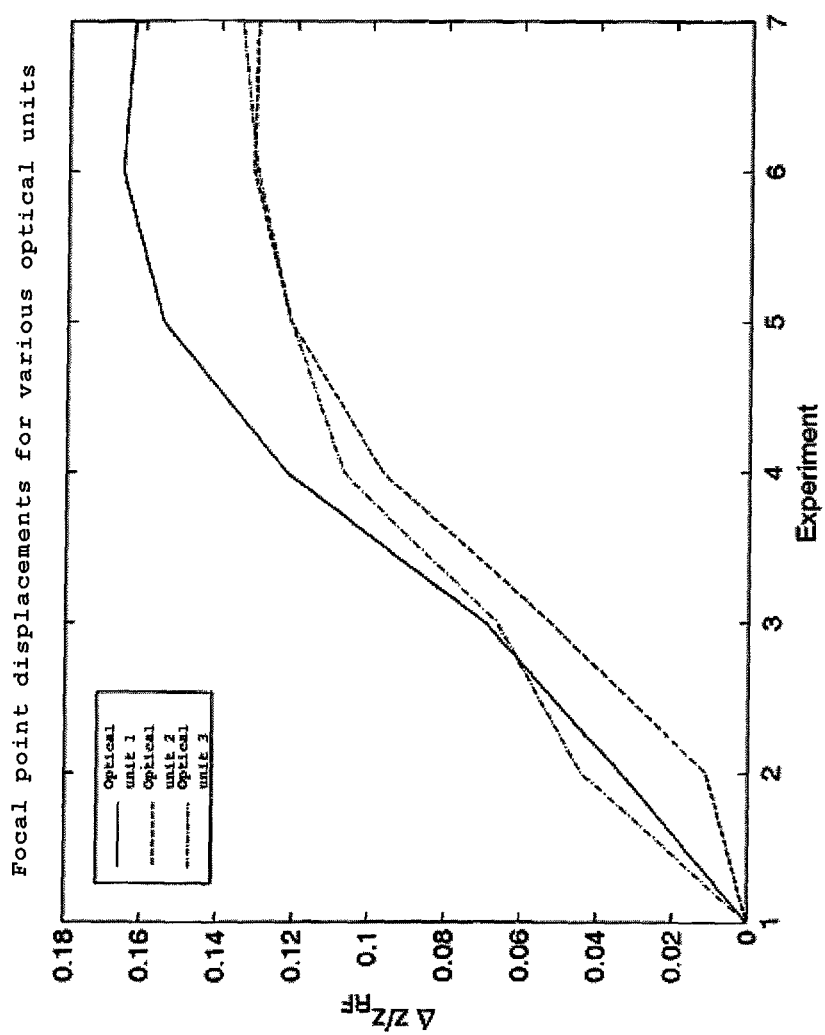
Figure 12:
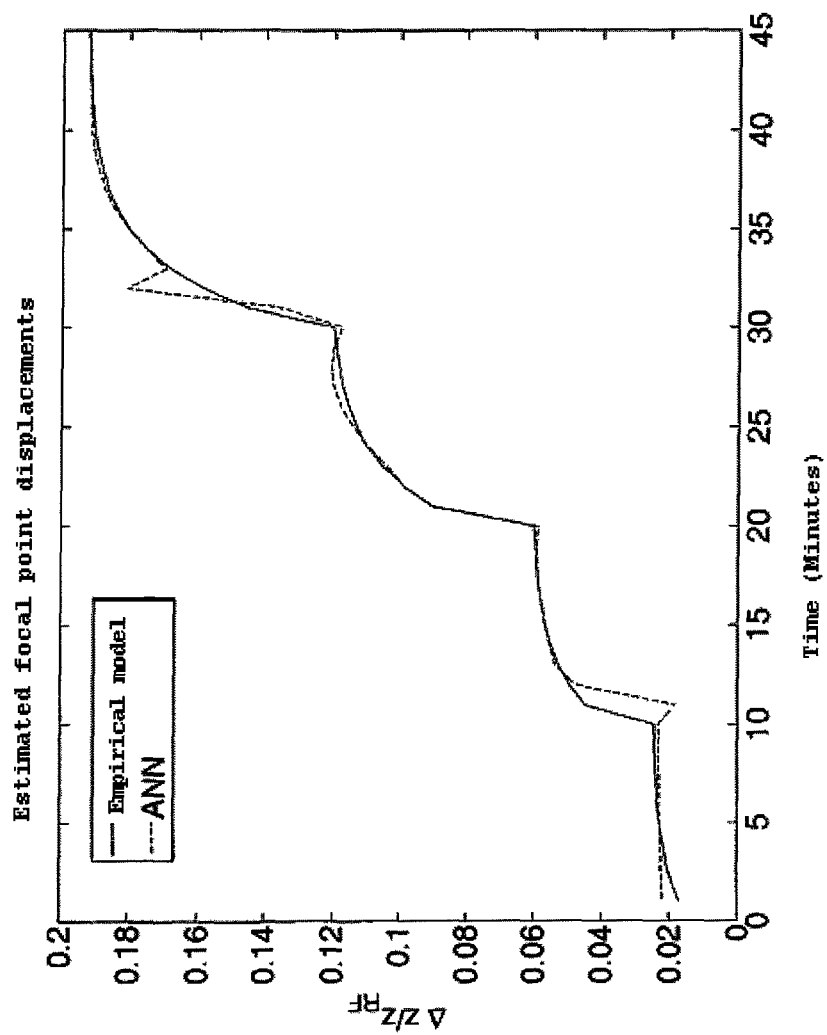

FIG. 11 shows a diagram showing averaged focal point displacements for various optical systems measured for various laser powers and time intervals (Exp. 1: 1 kilowatt, Exp. 2: 2 kilowatts, Exp. 3: 4 kilowatts, Exp. 4: 6 kilowatts, Exp. 5: 6 kilowatts after 5 minutes, Exp. 6: 6 kilowatts after 10 minutes, Exp. 7: 6 kilowatts after 20 minutes); and FIG. 12 shows a diagram showing focal point displacements which were calculated using an empirical model based on the experimental results, and also by means of an artificial neural network (1 to 10 minutes: 1 kilowatt, 11 to 20 minutes: 2 kilowatts, 21 to 30 minutes: 4 kilowatts, 31 to 45 minutes: 6 kilowatts, $Z_{RF}$=7.2 mm).

Figure 1:
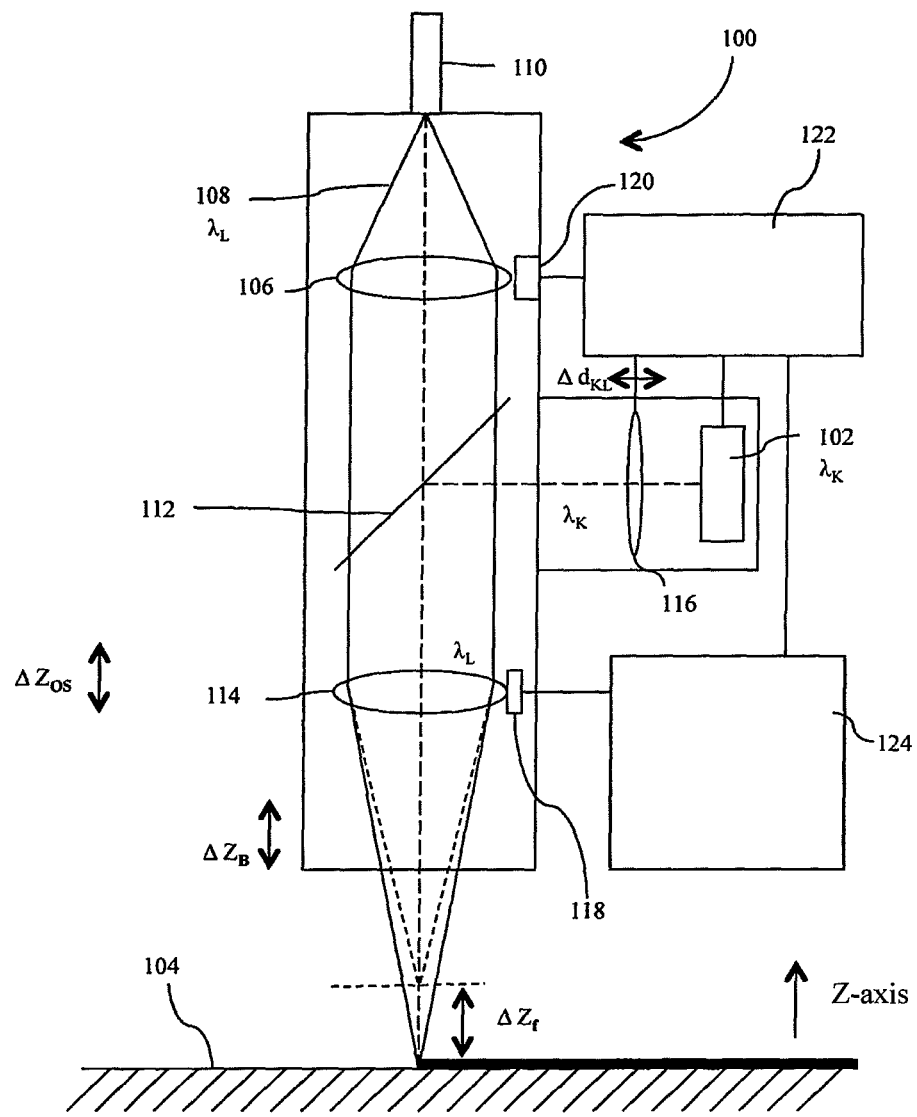
FIG. 1 shows a greatly simplified schematic view of a laser processing head according to the invention.

FIG. 1 illustrates a laser processing head 100 according to the invention, which can contain a process monitoring camera 102, a temperature detection unit, an optical system comprising adjustable lenses or mirrors, or a position control unit of the laser processing head 100 relative to the processing surface 104.

The optical system of the laser processing head 100 comprises a collimator lens 106, which collimates a laser beam 108 having the wavelength $\lambda_L$ from a fiber 110, wherein the collimated laser beam is focused by a beam splitter 112 by means of a focusing lens 114 onto the processing surface 104 or onto a position defined relative to the processing surface 104. A camera lens 116 is arranged upstream of the camera 102 and can be adjusted by a correction value $\Delta d_{KL}$ in the direction of the optical axis. The laser processing head 100 furthermore has a temperature sensor 118 at the focusing lens 114 and also a temperature sensor 120 at the collimator lens 106, which are both connected to an evaluation and control unit 122. In addition, a process monitoring sensor system 124 is connected to the evaluation and control unit 122.

The laser processing head 100 according to the invention comprises the camera 102 with the imaging optical unit 116 arranged upstream thereof in the beam path and serving for observing a processing region of a workpiece which is processed by means of the working laser beam 108, in particular by welding or cutting, the focusing optical unit 114 for focusing the working laser beam 108 onto the workpiece, and the evaluation unit 122, which is adapted to calculate an adjustment travel which compensates for or cancels a focal point displacement of the focusing lens 114 by means of an adjustment travel of the imaging optical unit 116 in the direction of the optical axis, which is necessary for focusing the camera image again in the event of a displacement of the focal point of the focusing lens 114.

The processing surface 104 can be illuminated by means of an illumination device (not illustrated in FIG. 1) with light having the wavelength $\lambda_K$ in contrast to the processing laser light wavelength $\lambda_L$ used. The illumination device can be fitted to an outer side of the laser processing head 100 in order to illuminate the workpiece surface 104 from outside. However, it is also possible for the light coming from the illumination device to be coaxially coupled into the beam path of the laser processing beam 108 by means of a beam splitter, as a result of which the illumination device can be integrated into the optical system of the laser processing head 100.

Alternatively or supplementarily, according to the invention, in order to obtain images, it is also possible to use a high dynamic range (HDR) method, wherein either an imaging sensor is scanned multiply, that is to say at least twice, per image at different points in time or a plurality of images, that is to say two, three or more images, are created with different exposure times or with a plurality of cameras and are subsequently taken into account computationally with one another to form at least one image. This procedure makes possible an image recording, image sequence recording or video recording which simultaneously visualizes the surrounding processing area, the process emission and also the vapour capillary or the keyhole in an image. In the case of an image recording of laser processing processes, the intensity values of the regions mentioned are distributed over a wide range that can be visualized by said method in one image. For display on a screen or display device in association with a process monitoring system or an evaluation or control unit with a comparatively low intensity resolution, an image or image sequence thus created is represented in a manner adapted by means of a grey-scale value or tone mapping method.

Figure 3:
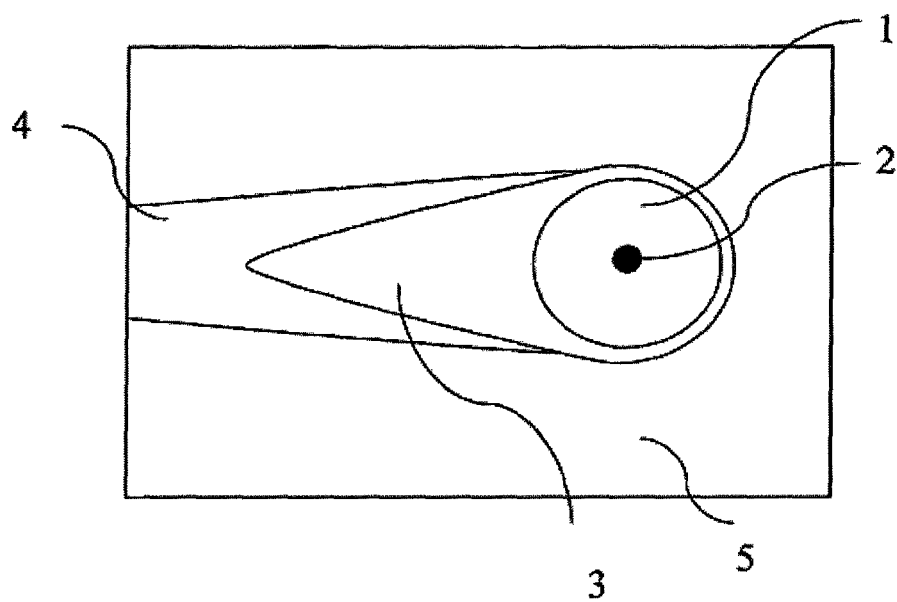
FIG. 3 shows a schematic view of a camera image processed by the HDR method according to the invention.
Figure 4:
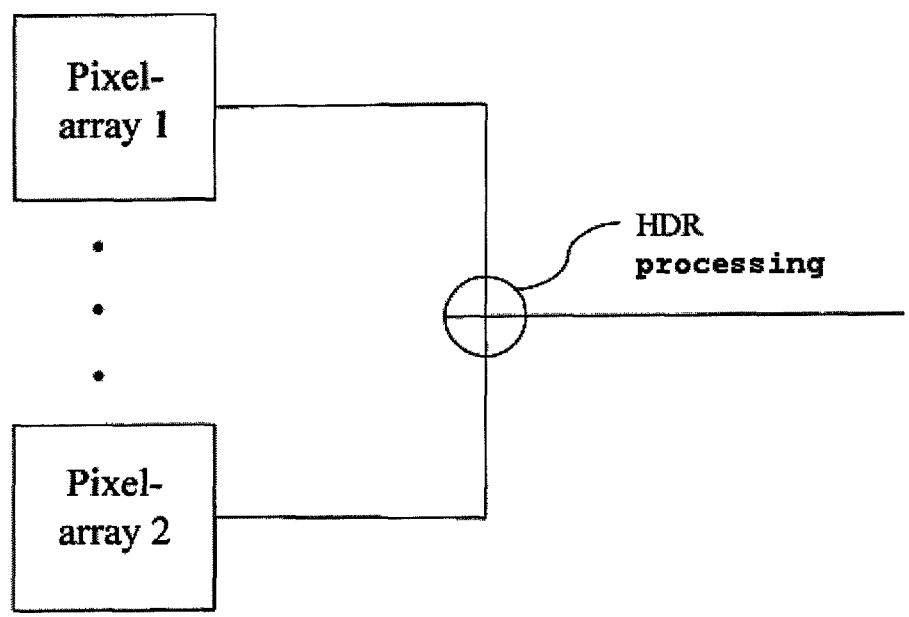
FIG. 4 shows a block diagram of an HDR image sequence processing according to the invention.

As illustrated in FIGS. 3 and 4, in order to carry out an HDR method or a method for better visualization of processing area, process emission and vapor capillary, according to the invention a plurality of images or pixel arrays are taken into account computationally with one another.

In FIG. 3, the process emission illustrated is provided with the reference symbol 1 and the vapor capillary (key hole) illustrated is provided with the reference symbol 2. Furthermore, FIG. 3 shows a melt pool 3, the weld seam geometry 4 and the processing surface 5.

The different images can arise as a result of multiple scanning of an imaging sensor or as a result of simultaneous image recording with a plurality of cameras, or as a result of sequential image recording with one camera, but different exposure times, referred to as a multi-exposure technique. The individual image recordings can be taken into account computationally with various types of method. This includes, in the simplest case, the summation and averaging of the individual image values of a plurality of images of an image sequence from at least two image recordings. For obtaining images more effectively, it is possible to average the image values or pixels from an image sequence from at least two image recordings in a weighted fashion.

As weighting method, either an entropy method can be used, for weighting according to the information content, or it is possible to carry out weighted averaging taking account of the camera response function. For this purpose, it is necessary to draw a conclusion about the real or realistic radiation energy per area, this being yielded by the following function:

$$x_{ij} = \frac{I^{-1}(y_{ij})}{t_i}$$

The weighting for the individual radiation energies then reads as follows:

$$x_j = \frac{\sum_i w_{ij} * x_{ij}}{\sum_i w_{ij}}$$

In this case, i is the image index from an image sequence of a plurality of image recordings, j is the pixel position, $t_i$ is the exposure time or scanning time of the image recording i, $y_{ij}$ is the intensity value of the pixel of the image recording i at the position j, $I^{-1}( )$ is the inverse camera response function, $x_j$ is the estimated radiation energy per area at pixel position j, $w_{ij}$ is the weighting function of the reliability model. The invention relates explicitly to the use of these illustrated HDR image computing methods in processing methods such as separation or joining of materials, in particular by means of laser processing heads and/or process monitoring systems connected thereto.

For the correction value that results from a focus position to be adapted relative to the workpiece, the following formula, for example, holds true:

$$\Delta z_f = A^* \Delta z_B + B^* \Delta z_{OS} = C^* \Delta d_{KL} + D^* \Delta T + E^* \Delta t + F^* \Delta P_L + G^*M + H^* C_{OG}$$

where A, B, C, D, E, F, G, H are parameters which are to be determined in a variable fashion and which can also assume the value "0".

The methods for determining the individual components are presented as follows:

The detection methods for a correction value $\Delta z_f$, which can be used individually and in combination, prove to be as follows:

When setting a process monitoring system, the focusing unit of the image-processing sensor system is set in such a way that the imaging signal produces an image that is as sharp as possible. In this case, the determination of the highest possible image sharpness or resolution can be found by various methods. The invention includes all customary methods for focusing or finding image sharpness, and some important methods will be mentioned explicitly:

Variance: Squared difference between the image values around the average value with subsequent summation. Given an image i(x,z) and S as the number of pixels, it can be calculated as follows:

$$VAR = \frac{1}{S} \sum_{x=0}^{m} \sum_{y=0}^{n} [i(x, y) - m_g],$$

and also $$VAR = \frac{1}{S} \sum_{x=0}^{m} \sum_{y=0}^{n} [i(x, y)]^2 m_g.$$

A high variance, or wide histogram, means good contrast.

Sum modulus difference (SMD): Measure based on image gradients, $$\nabla_i = \left[ \frac{\partial_i(x, y)}{\partial x} \frac{\partial_i(x, y)}{\partial y} \right]^T,$$

and its absolute value $$|\nabla_i| = \left[ \sqrt{\left( \frac{\partial_i(x, y)}{\partial x} \right)^2 + \left( \frac{\partial_i(x, y)}{\partial y} \right)^2} \right].$$

SMD is determined by $$SMD = \frac{1}{S} \sum_{x=0}^{m} \sum_{y=0}^{n} |\nabla_i|,$$

in the case of sharp images, the difference between pixel x and x+1 is very large.

Signal power (SP): The maximum of $$SP = \sum_{x=0}^{m} \sum_{y=0}^{n} [i(x, y)]^2$$

yields the best image state, also applies to the threshold value method modified according to Liao.

Fourier analysis: The discrete Fourier transform $$I(u, v) = \frac{1}{mn} \sum_{x=0}^{m} \sum_{y=0}^{n} i(x, y) e^{-2\pi j \left( \frac{xu}{m} + \frac{xv}{n} \right)}$$

and also the fast Fourier transform, which can be calculated more rapidly, are determined using $$I(u, v) = \frac{1}{m} \sum_{x=0}^{m} \left[ \sum_{y=0}^{n} i(x, y) e^{-2\pi j y \left( \frac{v}{n} \right)} \right] * e^{-2\pi j x \left( \frac{u}{m} \right)}$$

line by line and column by column. In the defocal image, the high frequency range, to be calculated by summation of the power spectra, decreases significantly compared with the focal image.

Laplace operator or Laplace focusing function: Represents the second statistical moment, $$L = k \sum_{u=0}^{d} \sum_{v=0}^{f} |(u^2 + v^2) I(u, v)|^2,$$

of the Fourier spectra and is associated with high frequencies. By means of operator identity and formula extension, this can be transformed into the time domain. The individual components contained therein have to be determined by approximation of the $2^{nd}$ derivative, whereby it is possible to obtain and directly determine $$L = mn \sum_{u=0}^{d} \sum_{v=0}^{f} [i(x+1, y) + i(x-1, y) + i(x, y+1) + i(x, y-1) - 4i(x, y)]^2.$$

Focusing by feature point or object tracking: Feature points are pixels with distinctive surroundings, such that they can be found again in a different image in the same image sequence. As a result, it is possible to determine movement tendencies in image sequences and the focusing can thus immediately operate in the correct direction. Moreover, it is possible, by means of object recognition algorithms in known image sequences, to create a focus window for the focusing function and thus to enable an optimum focusing of the target object. Many methods can be used for this purpose, but the intention is to use the Harris corner detector, the division of the image into specific subregions, image gradient and threshold value calculation, sum of square difference, fuzzy logic for autofocusing, support vector classification, principal component analysis, and many others.

In the method according to the invention, in a system setting process, firstly a reference image of the processing region is recorded, in order to serve as a reference for the image sharpness in comparison with a camera image recorded later, if the working focus position has shifted. This image can be created during or before a processing process.

During a processing operation, the image signal can then lose sharpness given constant setting parameters of the optical system, if e.g. a change in the position of the processing head 100 relative to the workpiece or a change in the properties of the optical system on account of thermal influences of the laser light takes place. As a result of heating of the focusing lens 114 on account of the absorbed laser power, the refractive index of the focusing lens 114 can change, as a result of which the focal point of the focusing lens 114 is shifted at the workpiece-facing side thereof in the direction of the optical axis. In general, the focal point of the focusing lens 114 and hence the working focus of the laser beam 108, that is to say the image of the working laser source that is generated by the focusing lens 114 on the workpiece, shifts towards the focusing lens 114. The working laser source can be e.g. the exit surface of an optical fibre 110 which supplies the laser light.

By means of autofocusing algorithms, according to the invention, the optical system, in particular the position of the focusing lens 114 or the position of the laser processing head 100, is in turn adapted in the direction of the optical axis during the processing process such that the imaging signal again yields the highest possible image sharpness or is as close as possible to the recorded reference image.

In this case, the necessary correction $\Delta z_{BS}$ of the optical system, according to the invention, can be effected by adapting the position of the laser processing head 100 relative to the processing surface 104 by $\Delta z_B$, or by adapting movable parts of the optical system, in particular the focusing lens 114 or individual components thereof (zoom) ($\Delta z_{OS}$).

In one particularly preferred exemplary embodiment, in order to avoid a direct influence on the processing result owing to adjustment of the laser processing head 100 or of the focusing lens 114 in an adaptation process, it is possible to adapt only a focusing unit, in particular the camera lens 116, of the process observation camera 102 by adjustment in the direction of the optical axis.

The correction value of the focusing unit 116 of the process monitoring camera 102, $\Delta d_{KL}$, which is determined by the adjustment and which is necessary to obtain an image that is as sharp as possible can be related to the necessary correction factor $\Delta z_f$ for adapting the focus position or the focal spot diameter either directly or indirectly taking account of the imaging ratios of the optical system.

In other words, by means of the image sharpness of the process monitoring camera 102, focusing is effected automatically by means of an independent focusing unit, e.g. an adjustable lens 116 or a mirror. This adaptation and the correction value $\Delta d_{KL}$ produced in the process can then be related to the focus position of the laser processing head 100 relative to the processing surface 104 directly by means of adapting parameters and can thus be controlled.

In the conversion or parameterization of this relationship of correction value $\Delta d_{KL}$ and correction value $\Delta z_f$, according to the invention, not only is it taken into account that the imaging ratios of process observation camera 102 with respect to the workpiece surface 104 and laser beam source with respect to the workpiece surface 104 have to be concomitantly included computationally, consideration is also given to the focusing differences on account of the different wavelengths of the observation system $\lambda_K$ and of the used processing laser light wavelength $\lambda_L$ on account of the chromatic aberration or other wavelength-dependent effects.

According to the invention, therefore, the parameters are calculated in accordance with the wavelength differences and imaging differences, from which it is then possible to calculate the displacement of the focus position of the working focus of the laser processing head 100. Heating of the collimator lens 106, which, on account of the displacement of its focal points in the direction of the optical axis, likewise brings about a displacement of the working focus of the working laser beam 108, in particular away from the workpiece in the direction of the focusing lens 114, cannot be detected by means of the above-described method by means of autofocus adaptation of the focusing unit 116 of the camera 102.

In a further configuration of the invention, therefore, a method is proposed which enables the working focus position correction of the working laser beam 108 to be carried out even better, in particular by means of a controller or a technical-cognitive system as described hereinafter, wherein overshooting or inappropriate corrections are furthermore avoided.

Figure 2:
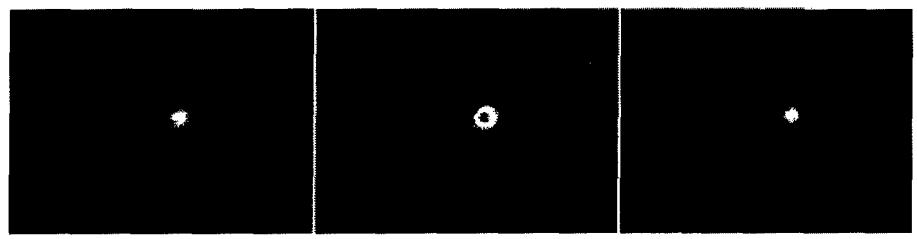
FIG. 2 shows photographs taken for a working focus position that is too near, optimal and too far.

A classification on the basis of extracted image features is used, according to the invention, to obtain from the image data possibly having a reduced dimensionality the information as to whether the focusing was chosen to be too far or too near. An artificial neural network, support vector classification, fuzzy logic or fuzzy K-nearest neighbour classifier, a reinforcement learning algorithm can serve as classification. FIG. 2 serves as an example of image sharpness differences.

One specific control approach for the z-axis is classifying for example three image recordings with a differing exposure time with regard to image sharpness (SMD) by means of a fuzzy K-nearest neighbour classifier. An image sharpness algorithm is applied to each image having a differing exposure time. The same applies to a classification with regard to the image sharpness of the image recordings and the principal components extracted therefrom from an image sequence having different image sharpnesses. For these image recordings having different exposure times it was possible to obtain a classification result that indicated whether the focusing of the observation camera 102 was chosen to be too far, optimal or too near. In this case, it was found that the long exposure time amounts to a high probability if the focus position with respect to the processing area 104 was chosen to be too far away, in other words the distance was chosen to be too large. If the distance from the workpiece is too small, or the focus position is too far behind the processing area 104 for a sharp image, then the short exposure time has a higher class probability. In this way, an HDR method can be linked with automatic focusing by means of a classifier distinguishing on the basis of image features the direction in which the focus position has to be influenced. In the specific case, the class association probability $$u_i(x) = \frac{\sum_{j=1}^{k} u_{ij}\left(\frac{1}{\|x-x_j\|^{\frac{2}{m-1}}}\right)}{\sum_{j=1}^{k} \left(\frac{1}{\|x-x_j\|^{\frac{2}{m-1}}}\right)}$$

was chosen for classification, where k denotes the nearest neighbours, and j denotes the running variable. $u_i(x)$ denotes the probability of a sample x belonging to a class i, $u_{jx}(x)$ is the known probability of the k neighbours concerned, and m is a scaling parameter between 1 and 2. The class association probability decreases with the relative distance of the sample with respect to a class. The summed class probabilities that occurred of a good, too near, too far class can be used as a weighted input for a PID controller (proportional-integral-derivative controller) for the z-axis. For these steps, it is explicitly also possible to use a support vector classification and other classification methods as described in the section with respect to technical cognition, and other control methods. At all events, it is thus possible to control and regulate the focus position relative to the workpiece by means of the z-axis of a laser processing head 100.

The need for a more complex control approach, that is to say not only to produce a direct relationship between image sharpness and working focus position of the laser processing head 100, is given not only by the wavelength differences, temperature profiles and many more, but also by the design of the conventional laser processing heads with a collimation and focusing lens. If the observation system is incorporated with a reflective surface between the collimation and focusing unit, then it must be taken into consideration that the change in the optical unit of the collimation unit 106 as a result of thermal influences is not detected by the process monitoring camera 102. Therefore, it is necessary also to tackle this change during compensatory balancing of the change in the focus position by means of a more complex control method as proposed in this invention.

Besides image sharpness, the temperature change, $\Delta T$, of the processing head 100 and thus of the optical system can constitute a sufficient criterion for a changed focus position. For this reason, it is detected by means of a corresponding sensor 120 in the laser processing head and can be related to the correction value $\Delta z_f$ directly and indirectly.

Alternatively, it is also possible to use the following parameters for a controller or a technical-cognitive system:

The time interval, $\Delta t$, for which the working laser is switched on in a processing step can lead to a changed focus position. For this reason, the running time can be directly or indirectly related to the correction value $\Delta z_f$. Alternatively or additionally, the latter can also be used as a feature for a controller or a technical-cognitive system.

The laser power, $\Delta P_L$, i.e. the light energy of the laser light which passes through the laser processing head 100, can likewise lead to a changed focus position. For this reason, the laser power can be directly or indirectly related to the correction value $\Delta z_f$. Alternatively or additionally, the latter can also be used as a feature for a controller or a technical-cognitive system.

A progression model, M, can likewise make a statement about a changed focus position. The latter can be obtained by measuring the caustic curve of the emerging laser radiation before start-up for different laser powers and running times. In this way, focus shift and focal spot diameter variation can be measured and a model which is directly or indirectly related to the correction value $\Delta z_f$ can be linearly approximated. Alternatively or additionally, the latter can also be used as a feature for a controller or a technical-cognitive system.

Similarly to the progression model, it is possible to find a cognitive empirical value, $C_{OG}$. The latter represents learned experiences on the basis of statistical and self-learning methods of a cognitive-technical system, which is explained in greater detail below. Said empirical value can be directly or indirectly related to the correction value $\Delta z_f$.

Figure 5:
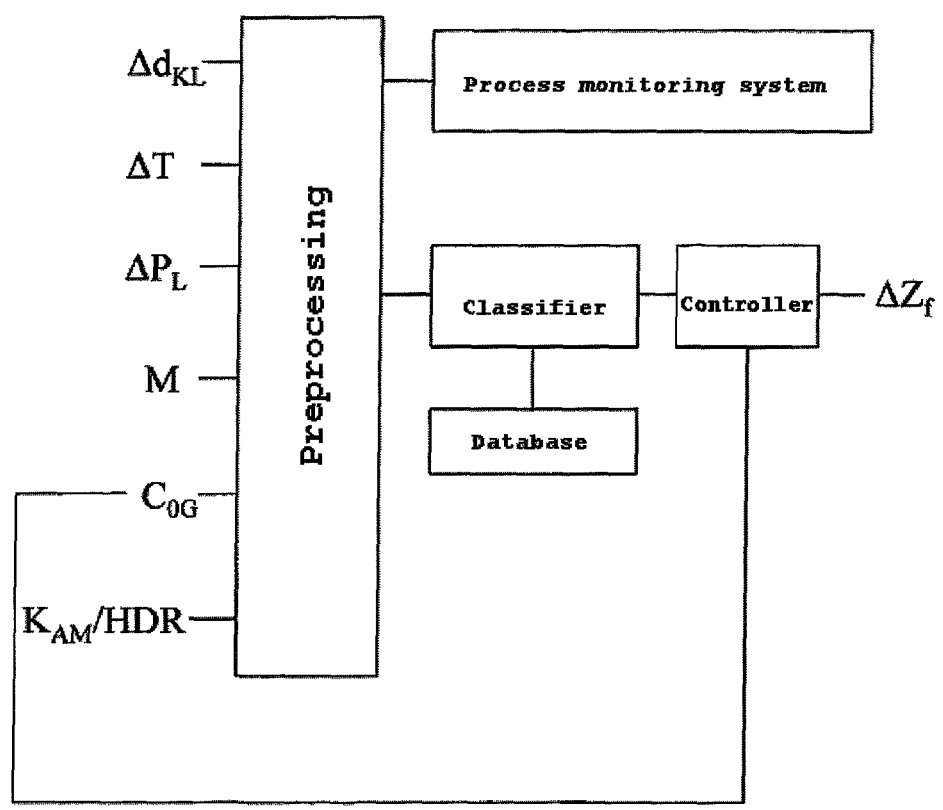
FIG. 5 shows a block diagram of a technical-cognitive system according to the invention.

FIG. 5 illustrates a technical-cognitive system with the corresponding controller.

The essential functional feature of this system is regulation or control of the correction value $\Delta z_f$ on the basis of many sensor results and input signals. It serves for achieving the desired result defined by an expert, by monitoring and classifying many input signals and using learned knowledge for signal processing.

Figure 6:
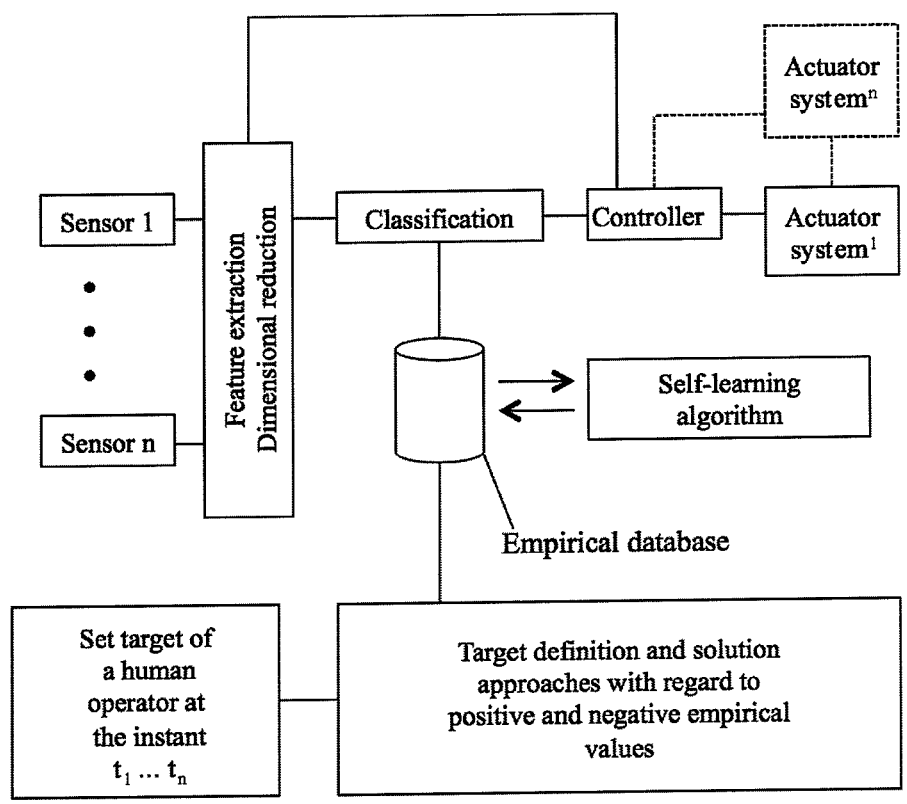
FIG. 6 shows a block diagram of a further technical-cognitive system according to the invention.

The system is called technical-cognitive since it has highly adaptive abilities similar to a human or natural learning, problem solving and decision ability. A system is technical-cognitive when, from at least two sensor units or an at least multidimensional sensor data set, it operates at least one actuator system and, if appropriate, the sensor data acquisition in a manner which was not precisely predetermined beforehand by a human expert, but rather on the basis of already existing or recorded and analyzed or learned empirical data extracted from a larger sensor data set by means of feature recognition and dimensionality reduction, stored in a database and a set target if appropriate with a solution approach, which was either predetermined directly by a human operator or resulted in a manner derived therefrom. A technical-cognitive system therefore works on solution or control or regulation approaches until it attains a set target, and subsequently monitors the target attainment in order, in the event of non-attainment occurring, to once again revise the learned solution approaches. FIG. 6 schematically describes such a technical-cognitive system. Such a system can be used for controlling robots, production installations and indeed also laser processing systems.

For more detailed description, the individual elements and methods which are used will now be explained.

In principle, any sensor that enables a sensor data output can be used as sensor system 124. Specifically, these are, by way of example, microphones or solid-borne acoustic sensors, cameras, photodiodes, probes, technical evaluation and monitoring signals and also actuator system parameters such as, for example, the laser power.

Feature extraction and dimensionality reduction: in this case, it is possible to use all methods which reduce the data volume and maintain the information content to the greatest possible extent. Specifically, these include principal component analysis (PCA), independent component analysis (ICA), wavelet analysis, Fourier, fast Fourier and Laplace analysis, feature and object recognition methods, ISOMAP, locally linear embedding, artificial neural networks, multidimensional scaling and many more.

The reduced data volume can be interpreted as a point cloud of a multidimensional space which has been obtained from a higher-dimensional space. By reducing the data, it is possible to compare the latter in a finite time with previously recorded and classified and/or learned data volumes. In this classification it is possible to determine whether the new sensor data are similar to already recorded sensor data, and to assign a probability to this similarity. If a defined threshold value for a similarity probability of a previously recorded data volume is exceeded, then it is possible to follow the solution or control or regulation approach previously stored thereunder. If the threshold value for a similarity probability relating to previously learned data volumes is exceeded, then the system is in a new situation.

The behaviour for a new situation can either be learned by interrogating a human operator, or tried out from the previous data and solution strategies according to the similarity principle. Use is made here of self-learning algorithms which, according to a set target, after trying out a self-developed approach, subsequently check whether a goal has been achieved, and correspondingly assess the selected solution approach. The following methods can be used for the classification, storing of empirical values and solution strategies, and as self-learning algorithms: support vector machines, support vector classification, fuzzy logic, information fuzzy networks, fuzzy K-nearest neighbour classifier, K-nearest neighbour classifier, reinforcement learning, Bayesian networks and Bayesian knowledge databases, naive Bayesian classifiers, hidden Markov chains, artificial neural networks and back propagation, regression analysis, genetic programming or decision trees.

The solution strategy resulting after the classification, or a controller or actuator system control, can be embodied in a simple manner, but it can also control the type of data acquisition. If, by way of example, no threshold value for a known data volume is reached, then the type of data acquisition can be changed. For example, this can be effected by adapting a wavelet analysis towards new frequency ranges, or by changing from PCA to ICA.

Most laser welding heads afford the possibility of connecting a coaxial camera that uses the same focusing lens as the laser beam. Consequently, a focus displacement that is produced by the heating of the lenses and influences the laser beam also alters the recorded video data. In the proposed approach, the sharpness of the recorded video data is used to monitor a focus displacement and change in distance relative to the workpiece surface. A distance control is achieved by means of a controllable z-axis. An additional artificial neural network enables the correction of uncompensated errors, such as displacements, for example, which are caused by the collimator optical system. According to the invention, process errors caused by lens heating are reduced and the process quality and other sensor data acquisitions are improved.

Vehicle production lines are customized for each different vehicle model, which leads to long configuration times and outage times if one or more tools are configured incorrectly. This leads to a growing need for flexible production lines with self-learning processing tools that are able to adapt independently to new processes and process environments. They can be either tools which offer a wide range of controllability or intelligent systems which use learned knowledge to fulfill new tasks.

Laser beam welding is among the technically most demanding process steps in present-day industrial production lines. On account of the main use thereof in the production of the vehicle body, a high accuracy and reliability must be guaranteed. Consequently, small changes in the process properties require a recalibration of the system in order to avoid defective parts.

The invention relates to the compensation of a thermal lens effect, also known as focus shift or focus displacement. On account of the continuous energy absorption of the optical system within the laser welding head, the laser beam properties can vary during the processing and welding process. The characteristic of the focus displacement can be calculated in the laboratory. However, these results can hardly be applied to a real production environment since here each system has its own configuration and a multiplicity of unknown influencing variables.

Although optical components composed of molten silicates ($SiO_2$) have a lower absorption rate at a wavelength of 1064 nm, emitted by an Nd:YAG laser source, the increase in laser power leads to an increase in the focus displacement, which requires countermeasures. Recent results are concerned with improved optics comprising new materials such as, for example, zinc sulfide (ZnS)-based lenses, which have a higher thermal conductivity. However, this approach does not avoid the focus displacement, but rather ensures a constant focal spot diameter. Similar results can be obtained with revised structures which enable improved optical correction of the laser beam.

Other approaches are aimed at measuring and controlling the focal spot position by detecting sensor data without altering the process optical system. These approaches are based principally on an analysis and a comparison of optical emissions for different spectral ranges and benefit from the chromatic aberration. As a consequence thereof, the relative distance between the process optical system and the workpiece can be controlled, by means of which positioning and focusing displacement errors can be avoided. By using controllable optics, it is possible to achieve small oscillations of the process, which enables an estimation of the focal spot position relative to the workpiece surface.

Since these techniques use process emissions, these are greatly dependent on the monitored process and thus require a different configuration for each process dealt with. In order to be able to manage this problem, a first step was carried out in the direction of self-learning techniques with artificial neural networks that are used to classify optical emissions. The training was carried out by altering the distance between the focusing optical unit and the workpiece for various constructions.

In the approach according to the invention, a constant distance with respect to the workpiece has to be ensured and adapted if a focus displacement occurs or the distance with respect to the workpiece changes. This can be achieved by the analysis of the recorded video data from a coaxial video camera. The camera uses in part the same focusing optical unit as the laser beam and is therefore subject to a similar focus displacement resulting in an unsharp image. The incorporation of a controllable optical unit for the camera permits the calculation of a control signal for the z-axis adjusting apparatus in order again to attain a sharp image.

Firstly, hereinafter a brief description of the focus shift or displacement will be given as an introduction, followed by a presentation of the tested sharpness estimation techniques, an artificial neural network (ANN), and the entire system construction. Secondly, experiments carried out will be described, comprising the measurements of focus displacements, the analysis of image data obtained during distance variation, and results obtained by the ANN.

Firstly, the theoretical background shall be explained.

The focus shift or displacement has to be described and quantified in order to develop countermeasures. A simple optical construction comprising a processing head which has only one collimator lens and one focusing lens is assumed. On the basis of the optical properties thereof, it is possible to calculate the degree of focus displacement and thus estimate the required accuracy of the z-axis control. The control is based on algorithms which calculate the sharpness, a maximum search and the alteration of the control signal by means of a PID controller. In order to handle differences between the beam path of the laser beam and the camera image, which is caused by lens heating, an artificial neural network (ANN) is implemented.

Laser welding heads contain a set of lenses used to collimate the incoming beam and to focus it at a specific distance. The positioning of the focal spot relative to the workpiece surface is dependent on the application. Assuming that a fiber has a diameter of $d_f$, then it is possible to calculate the diameter of the focal point $d_0$ where $d_0 = f_{foc}/f_{col} * d_f$. Accordingly, the focal lengths influence the size and the position of the focal point relative to the processing optics.

The focal length f of a thin lens can be calculated by:

$$\frac{1}{f} = (n-1)\left(\frac{1}{R_1} - \frac{1}{R_2} + \frac{(n-1)d}{nR_1R_2}\right)$$

It follows from this that the focal length of the lens is dependent on the refractive index n and the radii $R_i$. Both terms are dependent on the temperature of the material used. For a cold start of the system it can be assumed that the lenses are at ambient temperature. During processing, the lenses absorb a certain proportion of the beam power and increase their temperature. This change $\Delta T$ leads to a change in the refractive index $\Delta n$ defined by dn/dT. For molten silicate, the values of dn/dT are in the range of $10^{-5}$/K. The refractive index at wavelengths of 1064 nm is 1.4496 at 20° C. and rises to 1.4503 at 100° C. The change in the radii is caused by expansion of the material, which can be approximated by applying the linear thermal expansion coefficient α. Since the thermal lens effect influences both the collimator optical unit and the focusing optical unit, the magnification term $f_{foc}/f_{col}$ can remain constant if the optical units are designed correctly. A customary approximation of the focus displacement is $$\Delta f = -\frac{\Delta P_{abs}}{2\pi k_W} \frac{f^2}{R_L^2} \frac{dn}{dT}$$

where $\Delta P_{abs}$ is the absorbed power, $k_w$ is the thermal conductivity and $R_L$ is the lens diameter. A rise in temperature reduces the focal length, which requires the welding head to be repositioned.

The focus displacements can be measured in various ways. One conventional method is a layer-based beam analysis in which the power density profile is detected for different distances with respect to the processing optical unit. In order to enable a comparison of the focus displacements for different optical units, a normalization with the corresponding Rayleigh length $z_{RF}$ is applied. The latter defines the distance from the focal point at which the beam diameter changes by a factor of √2. This leads to the following formula:

$$\frac{\Delta f}{z_{RF}} = \frac{f_F(t, P_L) - f_F(0)}{z_{RF}(t, P_L)}$$

The influence of time t is more difficult to describe and is dependent on a large set of external parameters, such as, for example, the cooling system, atmospheric properties and the thermal conductivity of the lenses. There are results which show that it takes up to 15 minutes until the focus displacement converges toward a specific value. Furthermore, it was found that a long-term influence over several months can be observed.

Protective windows arranged between the optical units and the workpiece should not influence the optical beam path, but they can nevertheless alter the position of the focal point. Here, too, the power absorption leads to an alteration of the geometrical properties and of the refractive index of the protective window.

Autofocus techniques will now be described below.

Most of the present-day image recording apparatuses are equipped with an autofocusing technique that makes it possible to obtain a sharp image, even if the object distance is unknown. Three different algorithms make it possible to obtain a value which describes the image sharpness: frequency analysis by means of Fast Fourier Transformation (FFT), the sum-modulus-difference (SMD) technique, and the Sobel operator using the Tenengrad method. These operators are defined as follows:

$$i_x = \frac{1}{4}\begin{bmatrix} -1 & 0 & 1 \\ -2 & 0 & 2 \\ -1 & 0 & 1 \end{bmatrix},$$

and $$i_y = \frac{1}{4}\begin{bmatrix} 1 & 2 & 1 \\ 0 & 0 & 0 \\ -1 & -2 & -1 \end{bmatrix}$$

The operators are applied to each pixel of the image. Values of Q, where $Q = i_x^2 + i_y^2$, which are greater than a defined threshold T are summed, which results in a scalar value S related to the image sharpness. The SMD algorithm has simplified operators, nor does it use a threshold value:

$$i_x = [-1 \ 1],$$

and $$i_y = \begin{bmatrix} -1 \\ 1 \end{bmatrix}$$

The root of Q is extracted and summed in order to obtain a scalar value S. The Tenengrad technique and SMD can be used in order to be implemented in a simple manner in cellular neural networks (CNN), such as can be found in image sensors, wherein the FFT technique is used for performance quality comparisons.

None of these techniques makes it possible to determine whether the sharpest image has already been attained, or the direction in which the focusing optical unit must be adjusted. Consequently, it is necessary to detect at least two images in order to obtain a control signal for the focusing optical units. In one configuration according to the invention, a focusing lens upstream of the image recording apparatus can be driven in a constant manner within its operating range. Consequently, the detection and the processing of the images result in a curve having a global maximum $S_{max}$. The focusing lens position for which this maximum is achieved makes it possible to obtain the image having the highest sharpness.

Artificial neural networks are described below.

By using artificial neural networks, it is possible to model the complex relationship between input and output signals. The term network refers to an ensemble of nodes which are sorted in different layers connected between the input and output layers. Each node is connected to a set of nodes from the previous layer used for the input signals, and the following layer is provided for distributing its output signal. The characteristic properties of a node i are the weightings $w_{ij}$ of the input signals $x_j$, a bias $\theta_i$ and a function $f_i$, which is applied to the sum of all the input signals and the bias. $w_{ij}$, $\theta_i$ and the set of nodes are determined during the learning process of the artificial neural network. Training data consists of a set of input signals for which the required output signal is known. This approach is known as supervised learning, since the result of the artificial neural network is provided while it is configured. The training or the learning process can be formulated as an error minimization process in which the node properties are altered until the difference between calculated and envisaged output is minimized.

An artificial neural network trained in this way can be used for traditional pattern recognition or for classification tasks. Furthermore, it can be used for a nonlinear system identification. The artificial neural network (ANN) then represents a nonlinear system whose parameters were determined during training. The training can be improved if an analytical model of the system to be simulated is present.

The z-axis control is described below.

Laser welding heads can be equipped with a coaxial video camera installed between the collimator optical unit and the focusing optical unit. Further lenses are required in order to obtain a sharp image of the melt pool, while the focal point is positioned correctly relative to the workpiece. A focal point displacement that occurs concerns both the laser beam and the video signal. By altering the camera-inherent optical unit, a sharp image can be re-established. This change can be used in order to calculate the focal length error that occurs and thus to adjust the z-axis in order to maintain correct focal point positioning.

It should be noted here that the thermal lens effect which influences the collimator optical unit remains unobserved and a focal length displacement error thus remains. In addition, the focal length plane of the camera is subject to a different focal length displacement than the laser beam focal point on account of the chromatic aberration. Both circumstances can be reduced by controlling the camera lens zero point ZP, as will be described in the next section.

A distance control with a control loop is described below.

In this approach, the distance between the camera-inherent lens and the image sensor is continuously changed. If the lens position for the sharpest image deviates between two successive intervals, the distance with respect to the workpiece has changed, or lens heating influences the focusing optical unit for the laser beam.

Assuming that a camera records images with a frequency of 1 kHz, and a lens oscillates at 10 Hz, then a control rate of 20 Hz can be achieved. Consequently, $S_{max}$ can be found within 50 images. Furthermore, the accuracy of the system is equal to 100 µm if the focusing lens enables a range for sharp images of 5 mm. Consequently, focal plane displacements of 100 µm or more can be detected.

Figure 7:
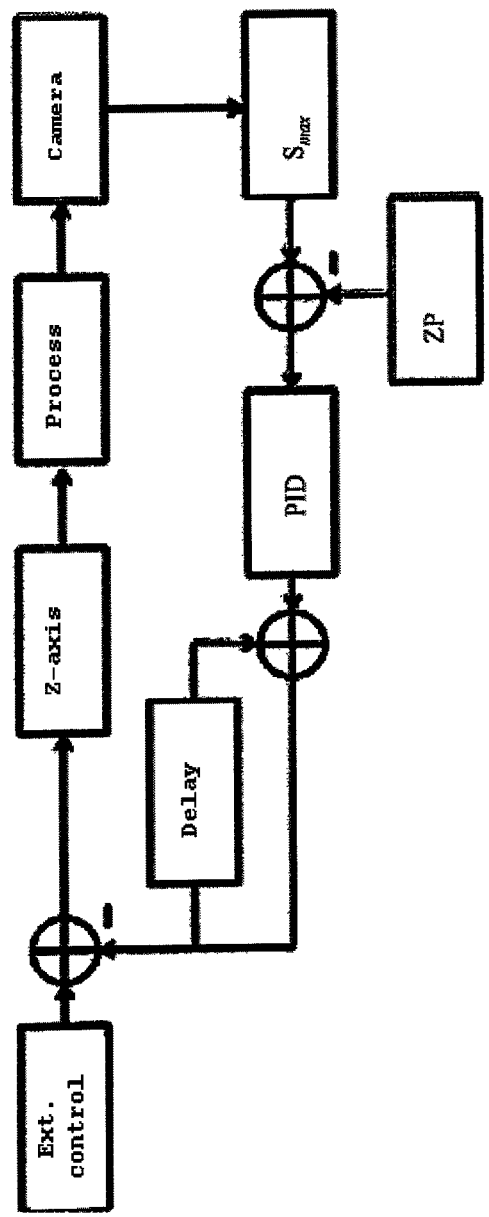
FIG. 7 shows a block diagram of a closed control loop of the z-axis adjustment based on a comparison of the camera lens position of the sharpest image $S_{max}$ with the lens zero position or zero offset position ZP.

The initial zero point positioning or zero offset position of the camera lens is designated as ZP. The difference with respect to the lens position of the sharpest image is $\Delta$ZP. It is used in order to be fed to a PID control, the output of which is communicated for the control or regulation of the z-axis adjustment. The P part is required in order to scale $\Delta$ZP into a suitable control signal, while the I and D parts are used in order to alter the system response. The overall system is shown in FIG. 7.

The modeling of the focal point displacement is described below.

The control loop described does not react to focal length displacements of the collimator optical unit, and so a focal point displacement error remains. In order to enable partial compensation of this phenomenon and of the focal plane difference between the laser beam and the camera optical unit, a correction of the camera lens zero point or zero offset has to be carried out. Since direct monitoring of the collimator optical unit is not possible (apart from the above-described temperature sensor at the collimator optical unit), a model is used in order to estimate the focal length displacement, based on the knowledge of the applied power, of the laser beam.

Figure 8:
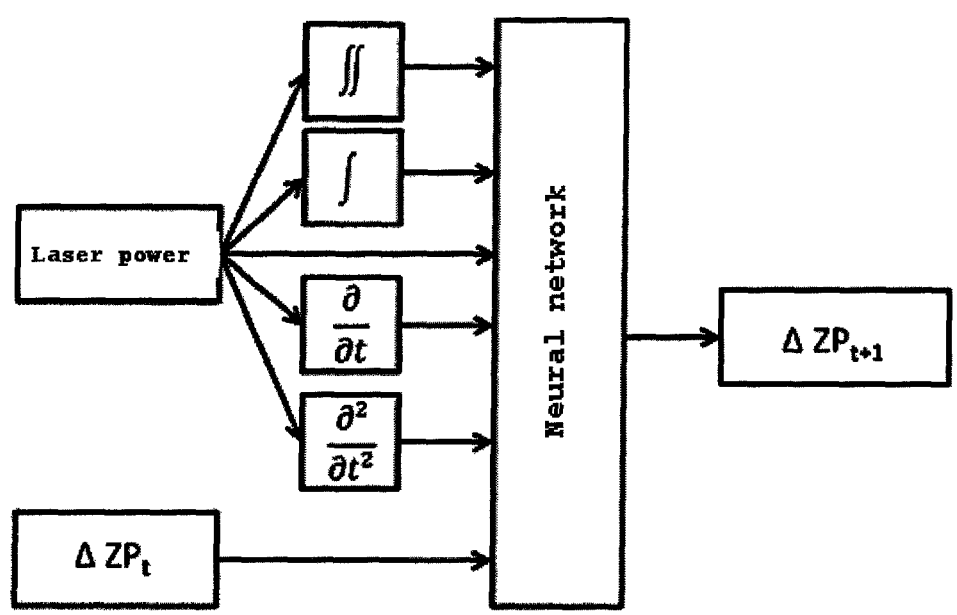
FIG. 8 shows a block diagram of an artificial neural network to which the applied laser power and process parameters for controlling the camera lens zero point or zero offset position are fed.

The lens heating effect exhibits highly nonlinear, time-dependent features. According to the invention, an artificial neural network is used to model these properties, wherein a multiplicity of process parameters and their derivatives and integrals with respect to time are fed to the artificial neural network, as is illustrated in FIG. 8. The training of the artificial neural network (ANN) requires the input of different laser powers with temporal changes, and information about the focal point displacement that occurs. This information can be obtained by the measurement of the beam caustic curve by means of corresponding measuring instruments, as will be demonstrated later in the experimental section.

Once a relationship has been established between the applied laser power and the focal point displacement that occurs, the zero point or zero offset of the camera lens can be set in accordance with the applied laser power and other system parameters. It follows therefrom that the control loop on the basis of the image sharpness reacts to rapid changes in the distance between the processing head and the optical unit, and to the influence of lens heating on the focusing optical unit, wherein the use of the artificial neural network aims to minimize long-term errors.

Experimental results will be presented below.

First experiments were carried out in order to evaluate the performance and the properties of various components of the control system. An analysis of the sharpness measuring techniques shown was carried out in order to decide which algorithm is best suited. A second set of experiments were carried out in order to obtain general information about focal point displacements for different laser welding heads.

The most evident effect of the thermal lens effect is the focus shift or focus displacement, which leads to a reduction of the distance between the focal plane and the focusing optical unit. A simulation of this effect can be achieved by adjustment along the z-axis of a laser welding head during the process, and so there is a change in the relative position between the beam focal point and the workpiece surface. This encompasses a variation in the power density, as a result of which different welding results are obtained during the process.

Figure 9:
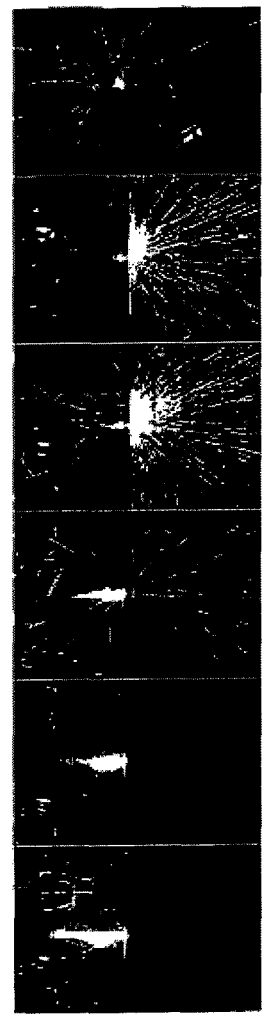
FIG. 9 shows images which were recorded during a process of welding an overlap structure, while the processing head increases the distance by 10 mm in each case.

For this experiment, a displacement of −5 mm to +5 mm was carried out on a 30 cm lap welding of 0.7 mm soft steel plates, resulting in a workpiece too near with respect to the welding head at the start and a workpiece too distant with respect to the welding head at the end of the process. A video of this experiment was recorded by means of a coaxial CMOS camera with a frame rate of 200 fps and a resolution of 192×256 pixels. An external camera recorded images of an optical process emission, as shown in FIG. 9. Firstly, no full penetration was achieved, which results in a large heated zone and flame-like process emissions. As the distance increases, the power density rises and leads to a full penetration event, observable by an emerging shower of sparks below the processed workpiece. A displacement of +5 mm does not interrupt the full penetration process, even though a satisfactory result is not obtained. A subsequent analysis of the weld seam showed that an acceptable quality could be obtained only for 1.5 cm.

During this welding process with a travel distance of 1.5 cm, a shift of the focal point of 0.5 mm was carried out. Consequently, the accuracy requirements made of the distance control are 0.25 mm or better.

Figure 10:
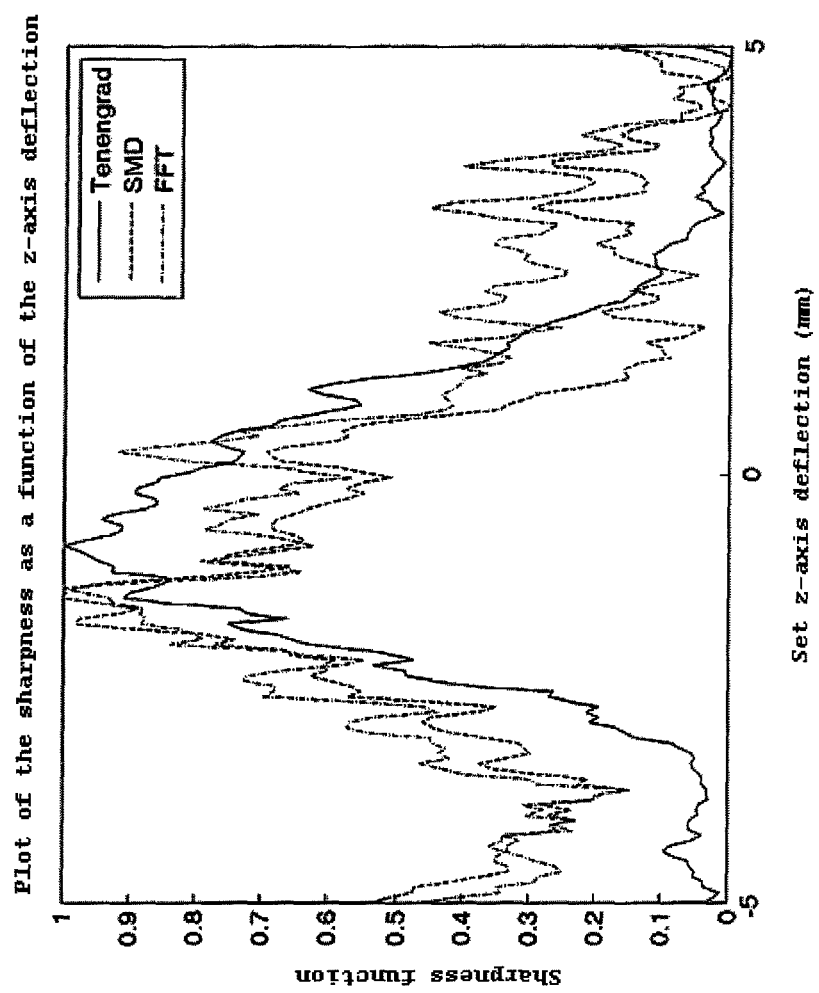
FIG. 10 shows results of sharpness estimation techniques which were applied to a coaxially recorded process-internal video during a simulated focal point displacement of ±5 mm.

The sharpness estimation was carried out for each recorded image frame with all three principles shown. The result of the algorithms was normalized over 10 frames and smoothed in order to avoid high-frequency noise. FIG. 10 shows the resulting curves. It is established that all three functions have different maxima, and so they all lie in a range of less than 0.5 mm z-axis offset. The comparison of the FFT and SMD results shows similar properties, although local maxima are emphasized to a lesser extent than in the latter. The Tenengrad function exhibits a lower variation than the FFT and SMD methods and has a less different local maximum, and so this function is the best suited function for the video provided.

The measurement of the focal point displacements is described below.

A deep understanding of the focal point displacements that occur was obtained by analyzing the laser beam for different optical configurations. In this case, the beam caustic curve is monitored by means of a Primes FocusMonitor, which measures the power density when passing through the sample by means of the beam with different distances with respect to the focal point. A repetition of this measurement permits the analysis of changes in the beam for a constant or varying laser power. The results can then be used to train the artificial neural network. The experimental process consisted of multiple measurements for different laser powers and time intervals, wherein the applied laser power in experiments 1 to 7 was equal to 1 kW, 2 kW, 4 kW, 6 kW, 6 kW, 6 kW, 6 kW and the time respectively corresponding thereto after initialization was 0 min, 0 min, 0 min, 0 min, 5 min, 10 min and 20 min.

The measurement set-up comprised a 6 kW fiber laser, a fiber having a diameter of 400 µm and three different optical units: optical unit 1 ($f_{col}$~150 mm; $f_{foc}$~250 mm), optical unit 2 ($f_{col}$~150 mm; $f_{foc}$~250 mm) and optical unit 3 ($f_{col}$~125 mm; $f_{foc}$~200 mm). The experimental process was carried out three times for optical unit 1 and optical unit 2 and once for optical unit 3.

FIG. 11 shows the averaged profile of $\Delta z/z_{RF}$. The measured displacement for experiment 1 was carried out at an initial focal point position $f_F(0)$. The increase in the focal point displacement for increasing laser power is clearly discernible. The displacements in experiments 2 to 4 (respective increase by 2 kW in the laser power) exhibits a virtually linear relationship with the laser power. In the case of experiments 4 to 7 (constant laser power at 6 kW), the displacements appear to converge around 1 mm after 10 min. Consequently, it is necessary to take account of time constants in the range of minutes for the control. These properties can be modeled by means of traditional elements of system theory, or in the form of an artificial neural network, as will be described further below, in order to calculate an estimation of the focal point displacement.

The Rayleigh length $z_{RF}$ was close to 7.3 mm for optical unit 1 and optical unit 2, and 6.6 mm for optical unit 3, which resulted in absolute focal point displacements of more than 0.5 mm at high laser powers. A control system can therefore be expedient in order to minimize the resulting production errors.

The focus displacement estimation by an artificial neural network, this being particularly preferred according to the invention is described below.

The understanding of the measured focal point displacements permits the modeling of the focal point displacement in a manner dependent on the applied laser power. This is expedient for initial tests of the artificial neural network on non-linear systems. The following functional relationship was developed empirically:

$$\frac{\Delta f}{z_{RF}} = \frac{P_L}{10 z_{RF}}\left(1 + 0,8\left(1 - e^{-\frac{t}{4}}\right)\right)$$

It reacts to increasing and steady-state laser power in the same way as the tested optical units of the previous section. A test with successively applied laser powers (1 kW, 2 kW, 4 kW, 6 kW) for 10 min led in each case to focal point displacement estimations as shown in FIG. 12. Changes in the laser power led to immediate changes in the focal length, but it took 10 min until a constant value was attained.

During the next process, an artificial neural network was trained with input and output data obtained from the formula presented above.

$$P_L, \int P_L dt, \int\int P_L dt\, dt,$$
$$\frac{\partial P_L}{\partial t} \text{ und } \frac{\partial^2 P_L}{\partial t^2}$$

served as input, and $\Delta f$ as output. The test was carried out using the same laser power as in the preceding experiment. FIG. 12 shows that the artificial neural network led to very similar results to those in the empirical model. It can therefore be assumed that the use of an artificial neural network is excellently suitable according to the invention for simulating nonlinear systems.

For use in real environments, it is necessary to obtain the training features of detected focal point displacement measurements carried out on the processing head which is to be controlled subsequently. In this case, the number of focal point displacement measurements carried out would not permit satisfactory results to be attained, since the training of the entire artificial neural network will be restricted to a few samples.

The conclusions from the results presented will be indicated below.

The focal point displacement or focus shift of a laser welding head can lead to unsatisfactory welding results, and focal point displacement compensation mechanisms are thus required in order to achieve uniform quality standards even with increasing laser powers.

Continuous control of the camera-inherent optical system and further image processing by means of sharpness ascertaining algorithms made it possible to determine whether or not the distance with respect to the workpiece is correct, and how the z-axis has to be adjusted. The Tenengrad sharpness estimation technique exhibited the most usable results according to the invention.

An experimental measurement of the focus displacements in the case of three different processing heads showed that a compensation in the case of applied laser powers of more than 4 kW is necessary if focal point displacements are intended to be limited to 0.6 mm. On the basis of these experiments, an empirical model of the focal point displacement was designed, which served as a training data source for an artificial neural network. Further simulations confirmed that the artificial neural network can be used according to the invention in order to modulate nonlinear system relationships.

Further work is aimed at the development of hardware such as, for example controllable camera optical systems and highly precise z-axis adjustments. In addition, the influence of optical aberrations is intended to be reduced.

The invention claimed is:

1. A laser processing head for processing a workpiece by means of a working laser beam, comprising
    a camera with an imaging optical unit arranged upstream thereof in a beam path and serving for observing a processing region of the workpiece which is processed by means of the working laser beam,
    a focusing optical unit for focusing the working laser beam with a processing laser light wavelength ($\lambda_L$) onto the workpiece surface or onto a position defined relative to the workpiece surface,
    an illumination device to illuminate the processing region of the workpiece with light having a wavelength ($\lambda_K$) of an observation system,
    an evaluation unit, which is designed to calculate a correction adjustment travel ($\Delta z_{OS}$, $\Delta z_B$) which compensates for a focal point displacement of the focusing optical unit relative to the workpiece surface or to a position defined relative to the workpiece surface by means of an adjustment travel ($\Delta d_{KL}$) of the imaging optical unit in the direction of the optical axis, which is necessary for focusing the camera image again in the event of a displacement of the focal point of the focusing lens,
    wherein the evaluation unit is designed, in the calculation of the correction adjustment travel ($\Delta z_{OS}$, $\Delta z_B$) of the focusing optical unit from the adjustment ($\Delta d_{KL}$) of the imaging optical unit, to include in the calculation focusing differences of the imaging optical unit and of the focusing optical unit on account of the different wavelengths of the observation system ($\lambda_K$) and the working laser light wavelength ($\lambda_L$).

2. The laser processing head as claimed in claim 1, further comprising a beam splitter for coupling the light from the illumination apparatus coaxially into the beam path of the laser processing beam in order to illuminate the processing region of the workpiece.

3. The laser processing head as claimed in claim 1, wherein the camera is designed to use a high dynamic range (HDR) method in order to obtain images.

4. The laser processing head as claimed in claim 1, wherein the evaluation unit is designed to use, for determining the adjustment travel ($\Delta d_{KL}$) of the imagining optical unit in the direction of the optical axis, which is necessary for focusing the camera image again, a method for finding image sharpness which comprises a variance method, a sum-modulus-difference (SMD) method, a signal power (SP) method, a Fourier analysis method, a Laplace operator or Laplace focusing function method, or focusing by feature point or object tracking methods.

5. The laser processing head as claimed in claim 1, further comprising an actuator system, which is designed to adapt the position of the laser processing head relative to a processing surface of the workpiece or movable parts of the optical system in order to traverse the correction adjustment distance ($\Delta z_{OS}$, $\Delta z_B$) for the compensation of the focal point displacement of the focusing optical unit.

6. The laser processing head as claimed in claim 5, wherein the evaluation unit is designed to directly control, by means of the actuator system, the position of the focal point of the focusing optical unit by traversing a correction adjustment travel ($\Delta z_{OS}$, $\Delta z_B$).

7. The laser processing head as claimed in claim 1, wherein the evaluation unit further comprises a cognitive system which, by means of a learning process, controls the adjustment of the focusing optical unit depending on a processing time or on processing situations such that the working focus of the laser beam always lies on the workpiece surface or in a position defined relative to the workpiece surface.

8. The laser processing head as claimed in claim 7, further comprising at least one sensor unit in addition to the camera, wherein the evaluation unit is designed to regulate or control the adjustment of the focusing optical unit with respect to the processing surface of the workpiece on the basis of the signals of the camera and of the at least one additional sensor unit.

9. The laser processing head as claimed in claim 8, wherein the at least one sensor unit is at least one microphone or solid-borne acoustic sensor, at least one additional camera, at least one photodiode, a probe and sensors for detecting technical evaluation and monitoring signals and also actuator system parameters such as the laser power.

10. The laser processing head as claimed in claim 7, further comprising a temperature sensor at the focusing optical unit and/or a temperature sensor at a collimator optical unit for detecting the temperature of the associated optical unit.

11. The laser processing head as claimed in claim 10, wherein the evaluation unit is designed to feed the temperature of the collimator optical unit, detected by the temperature sensor to a learning process in order to control the adjustment of the focusing optical unit depending on the processing time or the processing situation.

12. The laser processing head as claimed in claim 7, wherein the evaluation unit is further designed to include a time interval ($\Delta t$), a laser power ($P_L$), a progression model (M) or a cognitive empirical value ($C_{OG}$) into a learning process for adjusting the focusing optical unit depending on the processing time or on the processing situation.

13. The laser processing head as claimed in claim 7, wherein the evaluation unit is designed to use, for the regulation or control of an adjustment travel ($\Delta z_{OS}$, $\Delta z_B$) of the focusing optical unit on the basis of signals of at least one sensor, classification algorithms or self-learning algorithms such as support vector machines, support vector classification, fuzzy logic, information fuzzy networks, fuzzy K-nearest neighbor classifier, K-nearest neighbor classifier, reinforcement learning, Bayesian networks and Bayesian knowledge databases, naive Bayesian classifiers, hidden Markov chains, artificial neural networks and back propagation, regression analysis, genetic programming or decision trees.

14. A method for compensating for the change in focus position in a laser processing head as claimed in claim 1, comprising the following steps:
    focusing the working laser beam onto a workpiece in order to carry out a welding or cutting process on the workpiece, moving the focal point of the working laser beam along a processing line on a processing surface, wherein the distance between focusing optical unit and processing surface of the workpiece is kept constant, compensating for a focal point displacement of the focusing optical unit by adjusting the distance between focusing optical unit and processing surface of the workpiece by a correction adjustment travel ($\Delta z_{OS}$, $\Delta z_B$), wherein the correction adjustment travel ($\Delta z_{OS}$, $\Delta z_B$) of the focusing optical unit is calculated by means of an adjustment travel ($\Delta d_{KL}$) of the imaging optical unit in the direction of the optical axis, which is necessary for focusing the camera image of the camera again in the event of a displacement of the focal point of the focusing optical unit, wherein the focusing differences of the imaging optical unit and of the focusing optical unit on account of the different wavelengths of the observation system ($\lambda_K$) and the processing laser light wavelength ($\lambda_L$) used are included in the calculation.

15. The method as claimed in claim 14, wherein, for the calculation of the adjustment travel ($\Delta z_{OS}$, $\Delta z_B$) of the focusing optical unit, use is further made of cognitive systems which, by means of a learning process, control the adjustment of the focusing optical unit depending on a processing time or on processing situations such that the working focus of the working laser beam always lies on the workpiece surface or in a position defined relative to the workpiece surface.

* * * * *